May 25, 1943.  H. ROGER  2,320,247
EPISCOPIC PROJECTOR
Filed April 1, 1940   5 Sheets-Sheet 3

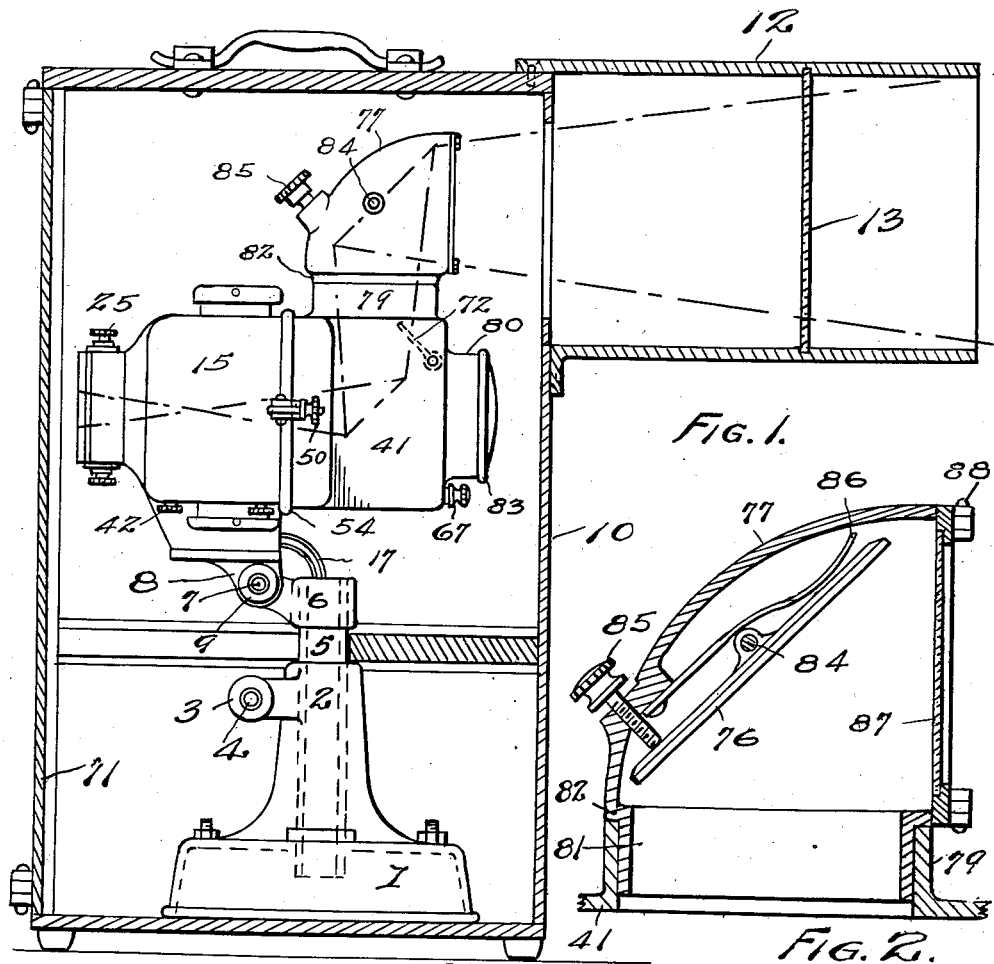
Fig. 1.
Fig. 2.
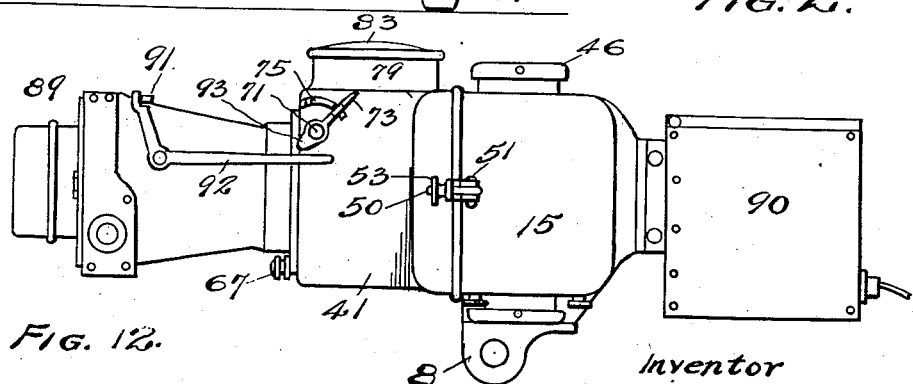
Fig. 12.
Inventor
HENRY ROGER
Chas. K. Davies & Son
Attys.

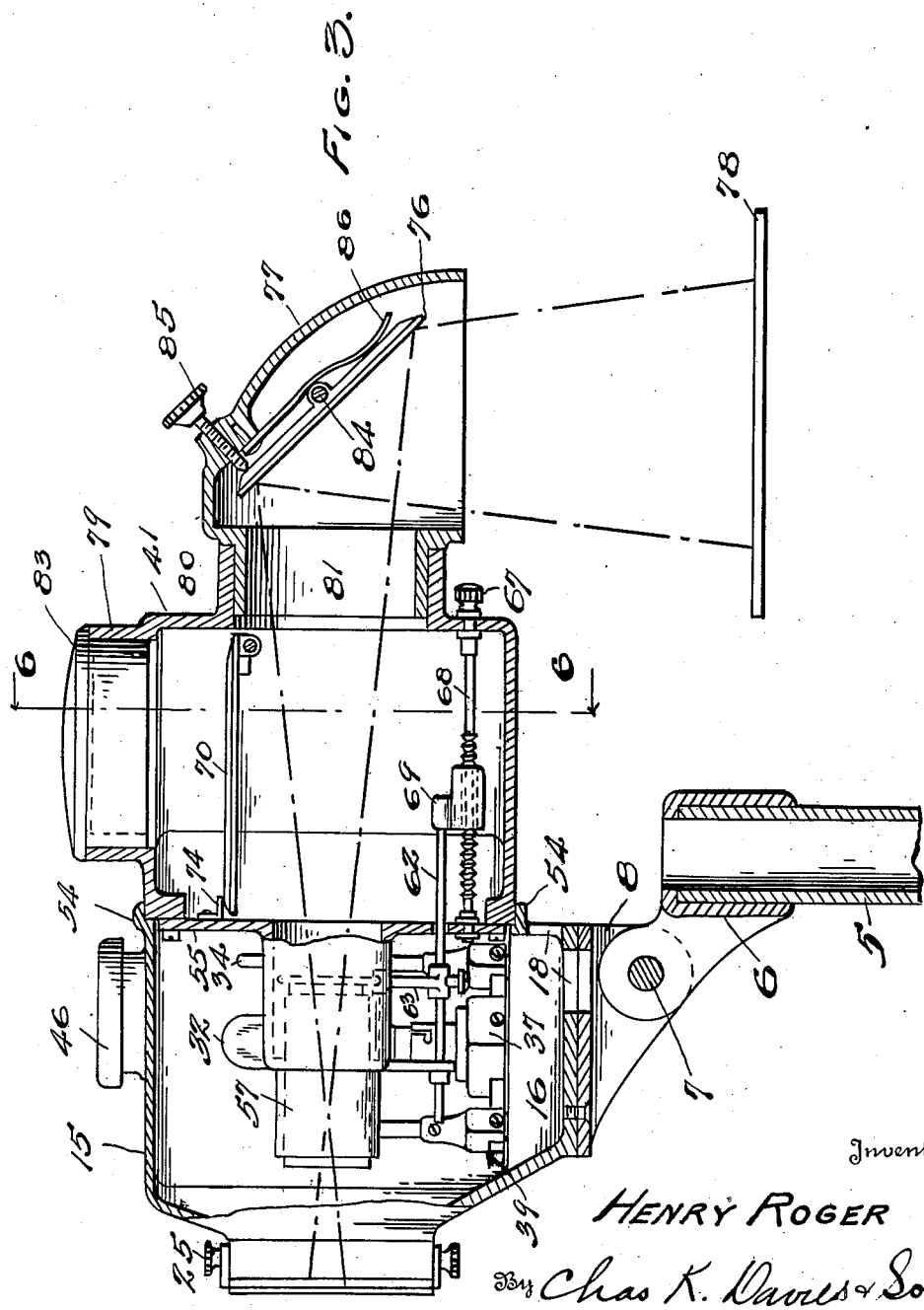

Inventor
HENRY ROGER
Chas. K. Davies & Son
Attys.

May 25, 1943.　　　　　H. ROGER　　　　　2,320,247
EPISCOPIC PROJECTOR
Filed April 1, 1940　　　　5 Sheets-Sheet 4
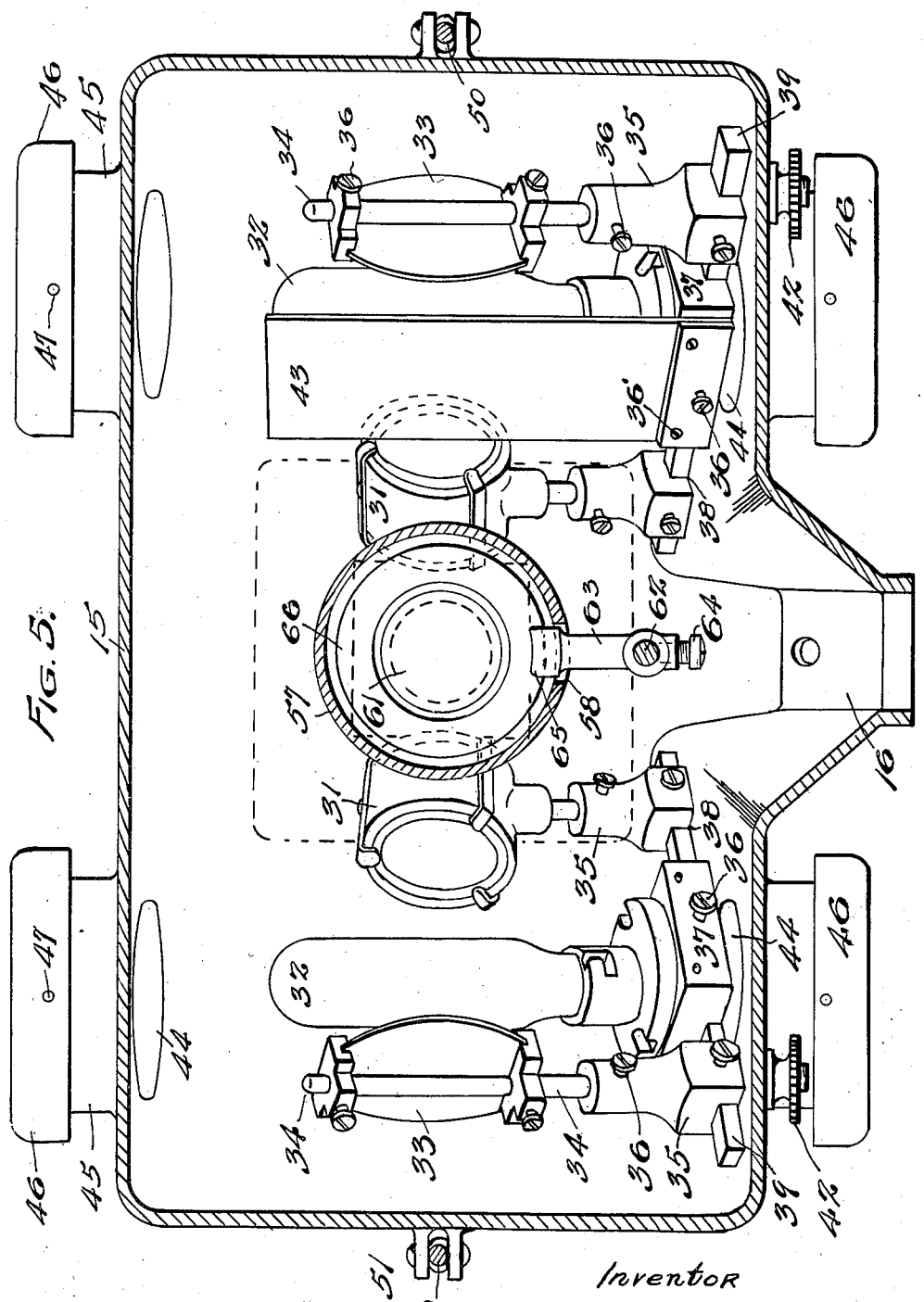
Inventor
By　HENRY ROGER
Chas. K. Davies & Son Attys May 25, 1943. H. ROGER 2,320,247
EPISCOPIC PROJECTOR
Filed April 1, 1940 5 Sheets-Sheet 5
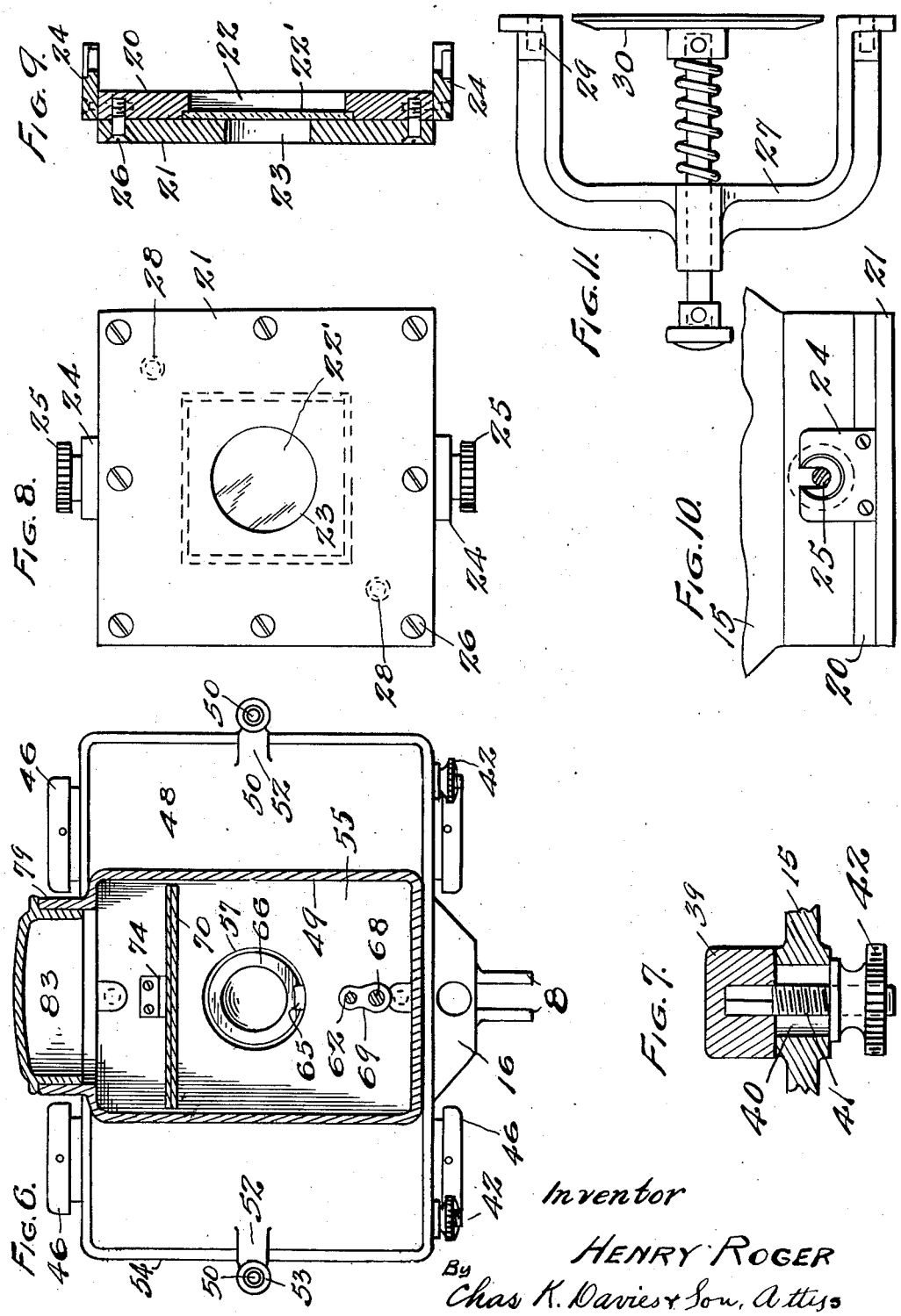

Patented May 25, 1943

2,320,247

UNITED STATES PATENT OFFICE 2,320,247

EPISCOPIC PROJECTOR

Henry Roger, Sandy Hook, Conn.

Application April 1, 1940, Serial No. 327,352

11 Claims. (Cl. 88—24)

My present invention relates to an improved episcopic projector of the reflex type involving apparatus for projecting real images upon a screen or other suitable surface. The subject matter of the present invention and application for patent is a continuation in part of application for Patent Ser. No. 215,447 filed by me under date of June 23, 1938, and which has become Patent No. 2,195,425 dated April 2, 1940. As in my prior application, the present projector is adapted for various uses, and it is especially designed as an optical instrument to be employed in examinations, photographic recordings, and for projecting and demonstrating opaque objects and surfaces upon a spaced screen.

For instance, the projector has found its widest use with skin specialists because it permits the operator and spectators, as well as the patient to observe the image of the skin projected upon a screen with clarity of detail, high magnification and in natural colors, thus rendering possible a close examination of the skin and an analysis of the existing conditions. These results are achieved with a simplicity of operation of the projector hitherto found impossible with existing devices with which I am familiar.

By the use of combinations and arrangements of parts of the projector, especially in the light housing, a surface examination of opaque objects is accomplished by the use of incident light provided by the use of an especially designed illuminating system and housing therefor.

In carrying out my invention I provide a separable light housing, and casing, in which casing are mounted a primary or image-reflecting mirror which is movable into and out of the optical axis of the projector. The projection-objective is mounted on the exterior of the front wall of the separable casing, which wall closes the rear open end of the light housing, and quick detachable means are provided for fastening the casing to the housing in order that the casing may readily be separated from the housing to gain access to the lighting units in the housing and to the projection-objective when necessary or desirable. The primary or image-reflecting mirror is located in the casing between two complementary seats or receptacles of the casing, one of which seats is located in the optical axis of the projector and the other seat or receptacle is located in an axis perpendicular to the optical axis. These seats or receptacles, as seen in the drawings are adapted to receive units adapted for various purposes, such as projecting the image upon a screen, for focusing purposes when desired, and they are adapted to receive covers or caps for purposes as will be described. One, or two if desired, of these units is equipped with a secondary or projecting mirror which receives the image and light beam from the primary mirror, and the secondary mirror projects the image upon a screen located either in a vertical plane or in a horizontal plane, as desired.

The construction of the light housing of the projector which has an open end opposite the end in which the object-aperture is located, together with the compact arrangement of the adjustable illuminating units in the light housing, facilitate cleaning, adjustment, and replacement of lamps and other parts when the separable casing has been detached from the light housing.

The projection-objective is mounted on and supported by a portion of the separable casing in such manner that when the casing is rigidly connected to the light-housing the projection-objective is enclosed within the light housing, and the projection-objective may be focused, manually from the exterior of the projector. By this arrangement of the projection-objective it may be focused or brought into close relationship with the object-aperture in the front end of the light housing. This location of the projection-objective at a comparatively short distance from the object-aperture of the projector permits focusing to obtain a higher magnification of the area or object, and a consequent enlargement of the image to be projected upon the screen, than is possible with projectors now in use, so far as I am aware. When high-power projection-objectives are employed in the instrument this high magnification enables the operator to focus the projector upon unusually small surfaces, objects, or areas and to project therefrom the magnified image upon the exterior screen for display or examination as herein illustrated, or for other purposes.

The lighting units are adjustable in the light housing for association with the projection-objective in such manner that the light may be focused or concentrated upon the object at the object-aperture of the projector, either in unison or independently.

For photographic recordings, after the proper focus has been attained, the primary mirror may be moved, synchronously with the shutter operating means of a camera attached to the projector and located in the optical axis of the projector.

The invention consists in certain novel combinations and arrangements as hereinafter more fully pointed out and claimed.

In the accompanying drawings:

Figure 1 is a view in elevation showing one embodiment of my invention, with the projector enclosed within a carrying-case, the primary and secondary mirrors being indicated by dotted lines as projecting an image upon a vertically arranged screen.

Figure 2 is an enlarged detail sectional view of the rotatably adjustable projecting hood or turret of Figure 1, showing a hinged ground glass focusing screen at the mouth or opening of the hood which may be employed in focusing the projector upon an object.

Figure 3 is a vertical sectional detail view of the projector, with parts in full elevation and the projector displaying an image upon a horizontal screen, the supporting stand of the projector being omitted for convenience of illustration.

Figure 5 is a transverse sectional view at line 5—5 of Figure 4, looking into the light housing from the rear, showing the duplex lighting units, one of which is equipped with a light-shield, and also showing the projection-objective in its holder and the actuating arm for the projection-objective.

Figure 6 is a vertical sectional view at line 6—6 of Figure 3 through the mirror casing and the primary mirror, and also showing the quick detachable means for fastening the separable casing to the housing.

Figure 7 is a detail sectional view through one of the lamp-supporting bars and a portion of the floor or bottom of the lamp-housing, together with the clamping means for said bar.

Figure 8 is an enlarged face view showing two auxiliary aperture-plates for the projector, and Figure 9 is a sectional detail view of these plates, omitting the attaching screws.

Figure 10 is a top plan view showing a portion of the aperture end of the projector with the auxiliary plates attached, and one of the attaching screws in section.

Figure 11 is a side view of a clamp device adapted to be mounted on the inner one of the auxiliary aperture-plates, for holding objects such as cloth, paper, coins etc. against the aperture of the projector.

Figure 12 is a view of the projector, as seen from the opposite side of Figure 1, with the supporting stand omitted, and illustrating the use of a camera whose shutter is synchronized for an exposure-movement as the primary mirror is removed from the optical axis of the projector.

Figure 4:
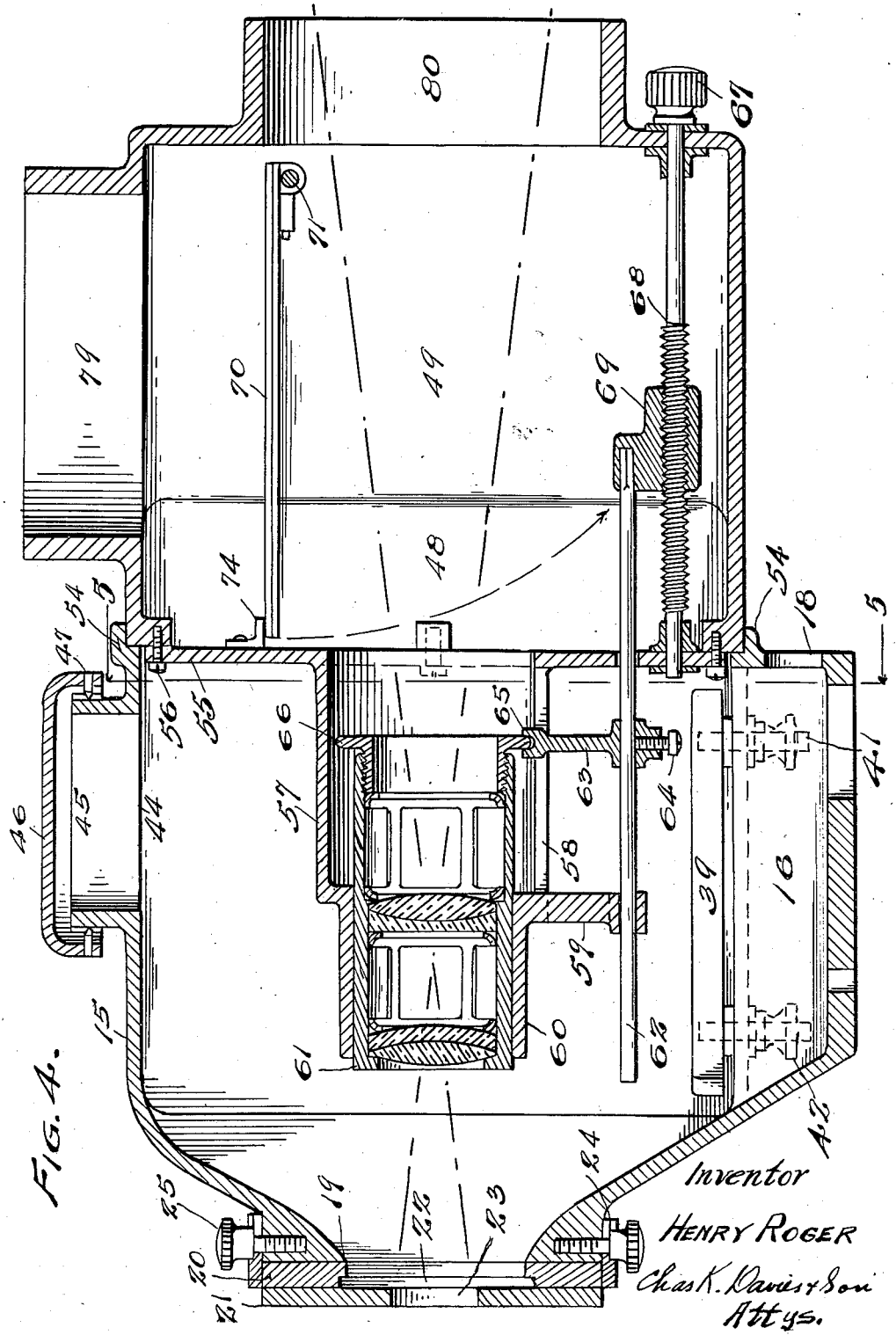
Figure 4 is an enlarged detail sectional view showing especially the projection-objective and its focusing means, together with one of the adjustable bars for supporting a lighting unit.

In the assembly view of Figure 1 it will be seen that I employ a portable instrument mounted on a suitable base or stand 1, having a split head 2 that is clamped by the threaded nut 3 and screw 4 on the tubular post 5, by means of which the projector may be vertically adjusted. For tilting the projector the post 5 has a head-bracket 6 on which the projector is pivoted by a bolt 7 that passes through flanges 8 of the projector, and the nut 9 on the bolt clamps the projector in adjusted or tilted position.

The instrument may be carried in a suitable case as 10 having a hinged door 11, and in Figure 1 the case is provided with a shadow box 12 and a ground glass screen 13 mounted in the shadow box.

The flanges 8 are integral with a bracket 14 secured to the underside of the lamp housing 15, and the housing has a central longitudinally extending depression 16 extending in a plane parallel with the optical axis of the projector and projecting below the housing proper to accommodate cables or cords, as 17, that pass up through the tubular post 5 and openings 18, to the duplex electric lighting units mounted in the housing. The lamp housing 15, at its reduced front end, is fashioned with an object aperture 19 alined with the optical axis of the projector, and of course, the lamp housing, when properly adjusted, is rigidly mounted on its supporting stand or base, through the use of the pivotally adjusted clamp at the head of the tubular post.

A pair of auxiliary aperture plates 20 and 21 may be used singly or jointly at the exterior of the object aperture 19, and these plates, as indicated in Fig. 4 are fashioned with a square aperture 22 and a circular aperture 23 respectively. In Figures 8 and 9, the aperture 22 is provided with a pane of glass as 22'. The plate 20 is mounted on the lamp housing by means of slotted attaching plates 24 and clamp screws 25, and the outer aperture plate, when used, is mounted on the plate 20 by means of screws 26.

For reproducing and projecting an image from paper, cloth, or the face of a coin, the plate 20 with its glass pane 22' is employed with a clamp yoke 27 in Figure 11, which yoke is fastened to the plate 20 by means of dotted screw holes 28 (Fig. 8) in the plate and attaching screws are threaded through complementary screw holes 29 in the yoke Figure 11.

For the above purpose, of course, the auxiliary plate 21 is removed from the plate 20, and the latter is attached by the screws 25 to the exterior of the lamp housing for use in connection with the object aperture 19. By using the spring presser-plate 30 the coin or other object is held against the exterior face of the glass 22', in the optical axis of the projector, and the adjustable light units are directed toward the object.

As best seen in Figure 5, the lamp housing encloses duplex lighting units, disposed one at each side of the optical axis of the projector and directed toward the object aperture or front of the projector, and with suitable electrical connections, these lighting units may be used jointly or separately, as desired or required. Each unit includes a condenser 31 with heat absorbing disks located at the front of the unit, an electric lamp 32 preferably of high intensity located back of the condenser, and a mirror or reflector 33 located back of the lamp.

The condensers and reflectors are mounted for vertical adjustment on posts 34 that project downwardly into the standards 35, and clamp screws 36 are employed to clamp the condensers and reflectors in vertically adjusted position. The condensers, the lamps and the reflectors are all separately adjustable toward and from the object aperture, and for this purpose the standards 35 and the bases 37 of the lamps are fashioned with bottom grooves 38 that slidably fit over the duplex adjusting bars 39, and set screws 36 are also used to fix these elements in adjusted position.

In addition to the vertical and longitudinal adjustments of the lighting units, the two units, separately, are adjustable laterally of the optical axis of the projector, through the use of the two adjustable supporting bars 39, 39. A very convenient means for this lateral adjustment is illustrated specifically in Figure 7 where the floor or bottom of the lamp housing is shown with a somewhat transversely extending slot 40, the bar is provided with a fixed bolt 41 depending through the slot, and a nut 42 is threaded on the protruding end of the bolt, below the housing.

In this exemplification of the lateral adjustment means a pair of spaced slots 40 are located at each side of the lamp housing, one at the front and one toward the rear, and each bar is provided with a bolt 41 near each end that protrudes through the slot, and the four clamp nuts 42 are employed to clamp the bars in adjusted position. The bars with their supported units may thus be shifted bodily and laterally in order to bring the lighting units into proper position for directing the light beams toward the object aperture of the projector.

In some instances, the high intensity lamps 32 may be removed and flash lamps may be substituted, as for instance for photographic purposes, and, as seen in Figure 5, if desired or required, a light shield 43 may be used on either or both of the lamps, and secured by set screws 36', or in other manner.

For venting the interior of the lamp housing by the creation of upwardly moving air currents, the housing is provided with lower and upper openings 44, adjacent the lamps 32, and exterior walls 45 of these openings are covered or capped by the spaced caps 46 secured on the walls 45 by pins, as 47. The spaced caps thus provide closures against ingress of light to the interior of the lamp housing, and at the same time provide for ingress and egress of air currents to ventilate the housing.

In combination with the lamp housing I utilize a separable casing 48 having a reduced rear end 49, and this casing is attached to the lamp housing by quick-detachable means as for instance bolts 50 pivoted on the housing at 51 which pass through slotted flanges 52 on the casing and clamp nuts 53 on the bolts are employed to clamp the casing to the housing. To insure a close joint or fit for the casing, the housing is fashioned with an exterior flange 54 to receive the adjoining edges of the casing, as best seen in Figure 4.

As seen in Figure 4 the rear end of the lamp housing is open and the front end of the casing 48 is also open, but the latter is closed by means of a detachable front wall or board 55 secured to the casing as by screws 56. The front wall or board 55 is fashioned with an integral holder 57 in the form of a cylinder and the holder is provided with a longitudinal slot 58 and a depending bracket arm 59, the front end 60 of the holder being stepped down in diameter to form a support for the slidable or reciprocal projection-objective 61. The holder and the projection objective are centered in the optical axis of the projector and located entirely within the enclosing lamp housing, and as indicated the holder is open at both ends for transmission of light rays through the lenses without obstruction.

The projection-objective is reciprocated or longitudinally adjusted with relation to the object-aperture 19 through the movement of a focusing rod 62 which is slidably mounted in a bearing of the bracket 59 and the wall 55 of the casing, and the rod is equipped with an actuating arm 63 adjustable on and secured to the rod by means of a set screw 64. The arm projects through the slot 58, and its forked or grooved end 65 engages, loosely, an annular flange 66 at the rear end of the projection-objective. Thus it will be apparent that as the rod 62 is moved longitudinally its arm 63 will slide the projection-objective along the optical axis of the projector for focusing purposes. The operation and control of the position of the projection-objective are accomplished from the exterior of the projector by turning the knob 67 that is fixed or mounted on the protruding end of a threaded spindle or screw bar 68 that is journaled at its ends in the front and rear walls of the casing and located near the bottom thereof below and parallel with the rear portion of the rod 62 that projects rearwardly into the casing. The screw bar passes through the non-rotary but traveling nut 69 located in the casing and as shown the rear end of the focusing rod is fixed in the non-rotary nut, so that the revolutions of the screw bar in the nut will feed the latter for the desired adjustment of the projection-objective.

The casing forms a mirror compartment, for the primary image-reflecting mirror 70 that is pivoted at 71 transversely of the casing and is operated from the exterior of the casing by a suitable lever as 72 in dotted lines in Figure 1 or 73 in full lines in Figure 12, and an interior stop 74 may be used to limit the upswing of the mirror as in Fig. 4, or a retaining device indicated at 75 in Figure 12 may hold the lever in adjusted position. The mirror is preferably of the front surface type and the reflecting surface is preferably of highly polished aluminum, and as indicated in the figures of the drawings, it is readily moved or swung into the optical axis of the projector for reflecting the light beam and image from the projection objective. When in position to intercept the light beam, the primary mirror may be employed in focusing the projection objective and the lighting units, after which adjustments the mirror may be swung out of the optical axis. Or, the mirror may remain in reflecting position for projecting the image and light beam to a secondary mirror, as 76 in a hood or turret 77.

One or more of these hoods or turrets may be included in the equipment of the projector, but one of the hoods, only, is employed for projection purposes, either to project an image upon a vertical screen as in Figure 1, or upon a horizontal screen 78 in Figure 3.

Thus it will be apparent that a single hood and its enclosed secondary or image-projecting mirror is adapted for interchangeable use with the projector, and for this purpose the casing is fashioned with two right-angularly disposed socket-flanges or seats 79 and 80. These flanges are of cylindrical or annular shape, the axial center line of the seat 79 being disposed at right angles, or perpendicular to the optical axis of the projector, and the axial center line of the seat 80 being on the optical axis of the projector. The base of the hood is also provided with an annular flange 81 that fits neatly in either of the socket flanges 79 or 80, and the flange 81 is rotatable in the socket flange for adjustment of the hood and its mirror. The hood is fashioned with an annular shoulder 82 that is seated on the edge or annular rim of the socket flange to insure a light proof joint, and the hood-flange fits into the socket-flange with sufficient friction to hold the hood in rotatably-adjusted position. When one of the socket flanges is in use, the other socket flange may be closed by a flanged plug, as 83 in Figures 1 and 3.

As best seen in Figure 2, the secondary or projecting mirror 76 is pivotally mounted at 84 in the hood 77, and the mirror may be adjusted to proper position and focus by means of a set screw 85 bearing on the back of the mirror and a spring 86 mounted within the hood and also bearing against the back of the mirror at the opposite side of the pivot. In Figures 1 and 2 a door is hinged to the rectangular opening or mouth of the hood at 88 and this door is provided with a ground glass screen 87 for use in focusing the projector when the door is closed, but of course the door is opened when the instrument is projecting an image upon a vertically arranged screen.

In Figure 12 I have illustrated a conventional camera 89 at the rear of the projector, mounted on the annular socket flange 80, and an auxiliary light housing or illuminator 90 is mounted over the front object aperture 19 of the projector. This auxiliary light housing 90 may be furnished with lighting units similar to the main lighting units in the main housing, and the auxiliary units serve to illuminate an object, such as fabric, paper, and the like, from the rear, alternately with the incident lighting from the main housing. In such instance, the turret or hood 77, with the ground glass screen 87, is substituted for the closure cap 83 in Figure 12, in order that the reflected image may be observed on the screen for accurate focusing.

When the camera is utilized for photographic records, the shutter of the camera is operated in usual or suitable manner, as by a release lever 91, and this lever may be actuated by a bell-crank lever 92, which in turn is actuated by the cam 93 of the mirror lever 73. Thus the removal of the primary mirror 79 from the optical axis of the projector is first accomplished by the initial movement of lever 73 and then the shutter release lever 91 is actuated to make the exposure in the camera. This synchronous movement of the primary mirror and the focal plane shutter of the camera may be accomplished in various ways, but I have illustrated a simple and mechanical connection for this purpose. The two lighting units in the light housing are employed to illumine the object, and since these light sources are practically constant, the taking of enlarged photographs is greatly simplified. If a photo flash bulb is substituted for one of the usual bulbs or lamps in one unit, the other lighting unit may be employed in usual manner for focusing the image on the ground glass screen 87.

In Figure 3 where the image is being projected downwardly on the screen 78, projected images of objects such as printed matter, handwritings, or pictures, appear on the screen in natural unreversed position, and the image may thus conveniently be read or inspected. Or, in some instances, the screen 78, may be a table or drawing board to receive the image, which may be of a tracing of a drawing; or the image may serve for inspection of tools, gears, spindles, and other mechanical parts, by imposing their profiles on the board or table.

The carrying cabinet in Figure 1, in addition to its usual function, may be utilized to enclose the projector in rooms that are not, or cannot conveniently be darkened for the projection operations, and the shadow box with its screen 13 is employed to increase the distance of projection, with a resulting larger image on the screen.

Having thus fully described my invention, what I claim as new and desire to secure by Letters Patent is:

1. In an episcopic projector, the combination with a light protecting housing having a front object-aperture alined with the optical axis of the projector, and means within the housing for illuminating the object-aperture, of a separable casing having a front wall closing the rear end of the housing, said wall having a slotted tubular holder alined with the optical axis and located in the housing, a focusing rod slidable in a portion of the holder, a projection-objective slidable in the holder, an actuating arm mounted on the rod and connected with said projection-objective, and control means exterior of the casing for reciprocating the slidable rod.

2. In an episcopic projector, the combination with a light protecting housing having a front object-aperture alined with the optical axis of the projector, and means within the housing for illuminating the object-aperture, of a separable casing having a front wall closing the rear end of the housing, said wall having a slotted tubular holder alined with the optical axis and located in the housing and a supporting bracket rigid with the holder, a reciprocal focusing rod mounted in the bracket and said wall, an actuating arm rigid with the rod and a projection-objective slidable in the holder, a traveling non-rotary nut rigid with the rod and located in the casing, a threaded spindle journaled in the casing and engaging in said nut, and an exterior turning knob mounted on the spindle.

3. In an episcopic projector, the combination with a light housing having a front aperture in the optical axis of the projector, a rear separable casing having a detachable front wall closing the rear open end of the housing, and a projection-objective mounted on said wall in the optical axis and located in said housing, of an image-reflecting mirror mounted in the casing and means for moving said mirror into and out of the optical axis, means in the housing for illuminating the front aperture, a rotatively adjustable hood alined with the optical axis, and a projection mirror mounted in the hood in position to intercept a light beam from the image-reflecting mirror and project said light beam through the open front of the hood.

4. In an episcopic projector, the combination with a light housing having an object-aperture at its front end and an open rear end, and means within the housing for illuminating the aperture, of an intermediate casing having a projection-aperture, a projection-objective mounted on the front of the casing, means for connecting the casing with the housing whereby the projection-objective extends into the housing in optical alinement with the object-aperture, an extension rotatably adjustable in said projection aperture, and an angularly disposed mirror in the extension to receive a projected beam and direct the same to an exterior screen.

5. In an episcopic projector, the combination with a housing having an object-aperture in its front end and a rear open end, and means within the housing for illuminating the aperture, of a seperable casing and a projection-objective mounted on and exterior of the casing, means for connecting the casing to the housing whereby the projection-objective extends into the housing in optical alinement with the object-aperture, means for adjusting the projection-objective toward and from the object-aperture, said casing having a projection-aperture, a movable primary image-reflecting mirror mounted in the casing, and means for moving said mirror into and out of alinement with the object-aperture.

6. In an episcopic projector, the combination with a housing having an object-aperture in its front end and also having an open rear end, and means within the housing for illuminating the aperture, of a separable casing having a projection-aperture and a projection-objective mounted on the front of said casing, means for connecting the casing to the housing to close the open end of the latter and whereby the projection-objective extends into the housing adjacent the object aperture and in optical alinement therewith, a movable image-reflecting mirror mounted in the casing, and means for moving said mirror into and out of optical alinement with the object-aperture.

7. In an episcopic projector, the combination with a housing having an object-aperture, and means within the housing for illuminating the aperture, of a projection-objective mounted in the housing in optical alinement with and adjacent to the object-aperture, a separable casing and means for connecting the casing to the housing, said casing having a projection-aperture, and image-reflecting mirror mounted in the casing to receive a projected beam and reflect it through said projection aperture.

8. In an episcopic projector, the combination with a housing having an object aperture, and means within the housing for illuminating the aperture, of a projection-objective mounted in the housing in optical alinement with said aperture, means for adjusting the projection-objective toward and from said aperture, a separable casing and means for connecting the casing to the housing, said casing having a projection-aperture, a movable mirror in the casing to receive a beam, and means for moving the mirror out of optical alinement with the object-aperture.

9. In an episcopic projector, the combination with a housing having an object-aperture, and means within the housing for illuminating the aperture, of a projection-objective mounted in the housing in optical alinement with the aperture and means for adjusting the projection-objective toward and away from said aperture, of a separable casing having an extension and means for connecting the casing to the housing, an angularly disposed mirror in the extension to receive a projected beam and direct the same to an exterior screen, a focusing mirror mounted in the casing intermediate the projection-objective and the angular mirror, and means for moving the focusing mirror into and out of optical alinement with the objective aperture.

10. In an episcopic projector, the combination with a housing having an object-aperture at one end and an open end opposite said aperture, and means within the housing for illuminating the aperture, of a separable casing having a projection-aperture in optical alinement with the object-aperture and a second projection-aperture angularly disposed with relation to the first aperture, a projection-objective mounted on and in front of the casing, means for connecting the casing to the housing whereby the projection-objective extends into said light housing in optical alinement with the object-aperture, a movable mirror mounted in the casing between said projection-apertures, and means for moving said mirror into and out of optical alinement with the object-aperture.

11. In an episcopic projector, the combination with a housing having a front object-aperture and a rear open end, and means within the housing for illuminating the aperture, of a separable casing having a projection-aperture, said casing also having a detachable front wall closing the rear end of the housing, a tubular holder mounted on said wall and extending into the housing in optical alinement with the object-aperture, a projection-objective adjustable in the tubular holder, and means for moving the projection-objective close to and from the object aperture.

HENRY ROGER.